(12) United States Patent
Akazawa et al.

(10) Patent No.: US 7,313,558 B2
(45) Date of Patent: Dec. 25, 2007

(54) DISCLOSING METHOD, DISCLOSING SYSTEM, CENTRAL APPARATUS, AND COMPUTER MEMORY PRODUCT

(75) Inventors: Yoshiko Akazawa, Kawasaki (JP); Akinobu Miyamoto, Tokushima (JP); Masafumi Otsuka, Tokushima (JP)

(73) Assignee: Fujitsu Limited, Kawasaki (JP)

( * ) Notice: Subject to any disclaimer, the term of this patent is extended or adjusted under 35 U.S.C. 154(b) by 576 days.

(21) Appl. No.: 10/026,458

(22) Filed: Dec. 27, 2001

(65) Prior Publication Data

US 2003/0065664 A1  Apr. 3, 2003

(30) Foreign Application Priority Data

Sep. 28, 2001  (JP)  ............... 2001-304674

(51) Int. Cl.
  *G06F 7/00* (2006.01)
(52) U.S. Cl. ...................... 707/10; 709/218
(58) Field of Classification Search ............ 709/218, 709/203, 228; 705/14
  See application file for complete search history.

(56) References Cited

U.S. PATENT DOCUMENTS 5,999,971 A *  12/1999  Buckland .............. 709/218
2002/0120503 A1*  8/2002  Iwayama et al. .......... 705/14
2003/0097361 A1*  5/2003  Huang et al. ............. 707/10
2004/0010599 A1*  1/2004  Otobe ................... 709/228

FOREIGN PATENT DOCUMENTS

| JP | 10-11007 | 1/1998 |
| JP | 2000-187631 | 7/2000 |
| JP | 2000-276443 | 10/2000 |
| JP | 2000-322352 | 11/2000 |
| JP | 2001-188760 | 7/2001 |

OTHER PUBLICATIONS

Japanese Office Action mailed Jun. 13, 2006 corresponding to application No. 2001-304674.
Certification dated Aug. 11, 2006.

* cited by examiner

*Primary Examiner*—Charles Rones
*Assistant Examiner*—Belix M Ortiz
(74) *Attorney, Agent, or Firm*—Staas & Halsey LLP

(57) ABSTRACT

The central apparatus accepts headline information, authorized user information, and storage location information and stores the accepted browsable information etc. in association with the storage location information. When a user has transmitted identification information for identifying the user from his terminal apparatus to the central apparatus, the central apparatus receives the identification information. The central apparatus extracts the headline information and the storage location information based on the received identification information and the registered authorized user information. Based on the extracted headline information and storage location information, the central apparatus generates a hyperlink and then generates an HTML document containing the generated hyperlink. The generated document is then transmitted to the terminal apparatus of the user.

9 Claims, 11 Drawing Sheets

FIG. 3

USER DB — 151

| ID | PASS-WORD | STUDENT NUMBER | NAME | DEPT. | SUB. | STUDY ROOM |
|---|---|---|---|---|---|---|
| 1001 | ×××× | 11001 | ○×△△ | TECH. | ELEC. | ○× LABORATORY |
| 1002 | ×××× | 11002 | ○○○○ | TECH. | ELEC. | ○× CENTER |
| 1003 | ×××× | 11003 | △△○○ | TECH. | ELEC. | ○× STUDY ROOM |
| 1004 | ×××× | 11004 | ○○×× | TECH. | ELEC. | ○△ LABORATORY |
| ... | ... | ... | ... | ... | ... | ... |

FIG. 4

GROUP DB —153

DEPARTMENT DB 1531 | SUBJECT DB 1532 | STUDY ROOM DB 1533

| DEPT. | ID | SUB. | ID | STUDY ROOM | ID |
|---|---|---|---|---|---|
| TECH. | 1001 ? 1985 | ELEC. | 1001 ? 1080 | O× LABORATORY | 1001 1005 1009 |
| LAW | 2001 ? 2865 | INFO. | 1101 ? 1185 | OO STUDY ROOM | 1058 1059 1075 ⋮ |
| LIT. | 3001 ? 3255 | MECH. ENG. | 1201 ? 1265 | O× STUDY ROOM | 1003 1065 1072 1073 ⋮ |
| ⋮ | ⋮ | ⋮ | ⋮ | ⋮ | ⋮ |

FIG. 5

| FILE(F) EDIT(E) DISPLAY(V) JUMP(G) HELP(H) |
| --- |
| RETURN NEXT REREAD HOME RETRIEVE GUIDE PRINT STOP |
| BOOKMARK  JUMP: ▭ ▶  ASSOCIATED SITE |

LINK SET

HEADLINE INFORMATION   [MEMBER LIST FOR STUDY ROOM IN 2001]
(TITLE)

REGISTRATION LOCATION INFORMATION

INTRAMURAL URL   http://○xx.xxx.xx△△
   EXTRAMURAL URL   http://www.△△△.△△△

AUTHORIZED USER INFORMATION

| GROUP SPECIFICATION | | SEPARATE SPECIFICATION | |
| --- | --- | --- | --- |
| ○× STUDY ROOM | REFERENCE | 11001 | |
| ○△ STUDY ROOM | REFERENCE | 11002 | |
| ▭ | REFERENCE | ▭ | |
| ‥ | ‥ | ‥ | |

LIMITATION INFORMATION
⦿ AUTHORIZED  ○ LIMITED

FIG. 6

| BROWSABLE INFORMATION | | | | | |
|---|---|---|---|---|---|
| NO. | HEADLINE INFORMATION | REGISTRATION LOCATION INFORMATION | | AUTHORIZED USER INFORMATION | LIMITATION INFORMATION |
| | | INTRAMURAL URL | EXTRAMURAL URL | | |
| 001 | MEMBER LIST FOR STUDY ROOM IN 2001 | http:○xx.△△△ | http:△△△.○○○ | 1001 1005 1009 | AUTHORIZED |
| 002 | EXTRAORDINARY SUMMON | http:○△○.○○○.△x | http:xxx.○○.xx | 1085 | AUTHORIZED |
| 003 | XY TREATISE | http:○○.xxx.△x | http:△△△.xx.△△ | 1001 1010 1052 | LIMITED |
| ... | ... | ... | ... | ... | ... |

152

DISCLOSING METHOD, DISCLOSING SYSTEM, CENTRAL APPARATUS, AND COMPUTER MEMORY PRODUCT

BACKGROUND OF THE INVENTION

1. Field of the Invention

The invention relates to a disclosing method with which browsable information stored in a central apparatus can be disclosed in response to a request sent from a terminal apparatus connected to the central apparatus through a communication network.

2. Description of Related Art

Organizations such as a university and an enterprise generally have their own homepages with which their information can be freely browsed through the internet or their own intranet. On their homepages are uploaded many kinds of browsable information such as information of canceled classes and classroom changes which is disclosed on a university bulletin board and information of intra-enterprise notifications. To browse such a homepage, a user first inputs his ID and password given to him beforehand and, when his login request is authorized, a top page of the homepage is displayed on a browser.

After the top page is displayed, the user can go along a link to obtain browsable information which he wants.

Recently, however, homepage contents have been enriched and the amount of the browsable information branching from the top page has been increasing. This has brought about a problem that the user cannot easily access information he really wants. When the homepage contents are changed, the user clicks at a hyperlink indicated by "What's New" on the top page to display only changed contents. This permits him to obtain updated browsable information. With this configuration, however, the user cannot always obtain information necessary for him, since he can access only the updated information.

Moreover, in such an organization as a university and an enterprise, when a user accesses browsable information, two routes are available for him: one for making access through a closed communication network such as an intranet and the other for making access through an open communication network such as the internet. In a case of access through the intranet, a high security level is realized. However, in a case of access through the internet, realized is only a low security level, so that it is necessary to appropriately protect the browsable information corresponding to the level of security.

BRIEF SUMMARY OF THE INVENTION

The present invention has been made with the aim of solving the above problems.

It is a first object of the present invention to provide a disclosing method, a disclosing system, a central apparatus, and a computer memory product which records computer programs to effectuate a computer as the central apparatus, for permitting a user to easily access browsable information necessary for him among enormous contents, by containing, at a part of a page, information which is really necessary for him.

It is a second object of the present invention to provide a disclosing method, a disclosing system, a central apparatus, and a computer memory product which records computer program to effectuate a computer as the central apparatus, for avoiding unauthorized access to browsable information by imposing a limit on the browsable information according to an access path which the user uses.

A disclosing method of the invention in which browsable information stored in a central apparatus is disclosed in response to a request sent from a terminal apparatus connected to the central apparatus through a communication network, the disclosing method comprising steps of an acceptance step for accepting headline information of the browsable information, authorized user information of a user authorized to browse the browsable information, and storage location information of the browsable information; a registration step for registering the accepted headline information and the authorized user information in association with the storage location information; a reception step for receiving identification information for identifying a user, which identification information is sent from the terminal apparatus to the central apparatus; an extraction step for extracting the headline information and the storage location information based on the received identification information and the registered authorized user information; a generation step for generating a document containing a hyperlink made up of the extracted headline information and the storage location information; and a transmission step for transmitting the generated document to the terminal apparatus.

In the invention, the central apparatus accepts headline information of the browsable information, authorized user information of a user authorized to browse the browsable information, and storage location information of the browsable information. For example, supposing that a member list for a seminar of a university is the browsable information, the browsable information is a file of the member list for the seminar, the headline information is a "member list for XY seminar", the authorized user information is information of students belonging to the XY seminar, and the storage location information is, for example, a URL (Uniform Resource Locators) which is used to access the seminar member list. The central apparatus stores accepted headline information ("member list for XY seminar") and authorized user information (such as IDs of students belonging to the XY seminar) in association with the storage location information (URL).

When a user transmits the identification information (ID) for identifying him to the central apparatus, the central apparatus receives the ID and extracts the headline information and storage location information based on the received identification information and the registered authorized user information. For example, when the user is a member of a XY seminar, the "member list for XY seminar" as the headline information and the URL as the storage location information are extracted. Based on the extracted headline information and storage location information, the central apparatus generates a hyperlink and a document containing the generated hyperlink such as an HTML (Hyper Text Markup Language).

Then, the generated document is transmitted to a terminal apparatus of the user. By this step, a common browsable information is displayed on the top page of the browser of the user and, additionally, a hyperlink used for accessing information which is really necessary for the user is also displayed, thus providing an efficient way to obtain information.

Moreover, in the invention, the central apparatus, when accepting the browsable information, further accepts limit information for limiting browsing of the browsable information according to whether the request has been sent through a communication network such as an intranet or through an auxiliary communication network such as the internet. That is, there are two types of the browsable information: information which is open for outsiders such as information of canceled classes, and information which preferably is kept secret from outsiders such as seminar research reports. In the invention, limitation for limiting browsing is accepted and stored according to an access path which the user uses, i.e., according to whether the user makes access through the intranet or the internet.

Specifically, as for a seminar research report which needs limitation on browsing, the limitation information is registered. As for information of canceled classes which needs no limitation on browsing, no limitation information is registered. When the request is sent through an auxiliary communication network such as the internet, headline information and storage location information are extracted on the basis of the received identification information, the registered authorized user information, and the limitation information. That is, the seminar research report, which has browsing limitation, is not extracted. On the other hand, when the request is sent through a communication network such as an intranet, the headline information and the storage location information are extracted without such limitation.

Moreover, in the invention, the information to be disclosed is controlled according to registered contents of the storage location information based on the access path. Two types of information is registered: first storage location information in which a storage location of the browsable information is set to be disclosed when the request is sent through an internal network and second storage location information in which a storage location of the browsable information is set to be disclosed when the request is sent through an external network. To limit disclosing, no storage location information is set. For example, when the first storage location information is not set, the system judges that the request sent through the internal network has no authority for browsing and does not give corresponding headline information. Also, when the second storage location information is not set, the system judges that the request sent through the external network has no authority for browsing and does not give corresponding headline information. Thus, it is possible to control browsing authority according to the set contents of the storage location information.

Since the information to be disclosed can be thus controlled according to an access path, security of the information to be browsed can be guaranteed.

The above and further objects and features of the invention will more fully be apparent from the following detailed description with accompanying drawings.

BRIEF DESCRIPTION OF THE SEVERAL VIEWS OF THE DRAWINGS

FIG. 3 is an explanatory view for showing a record layout of a user DB;

FIG. 4 is an explanatory view for showing a record layout of a group DB;

FIG. 5 is an explanatory view for showing an image displayed when registering browsable information;

FIG. 6 is an explanatory view for showing a record layout of a browsable information DB;

DESCRIPTION OF THE PREFERRED EMBODIMENTS

Embodiment 1.

Figure 1:
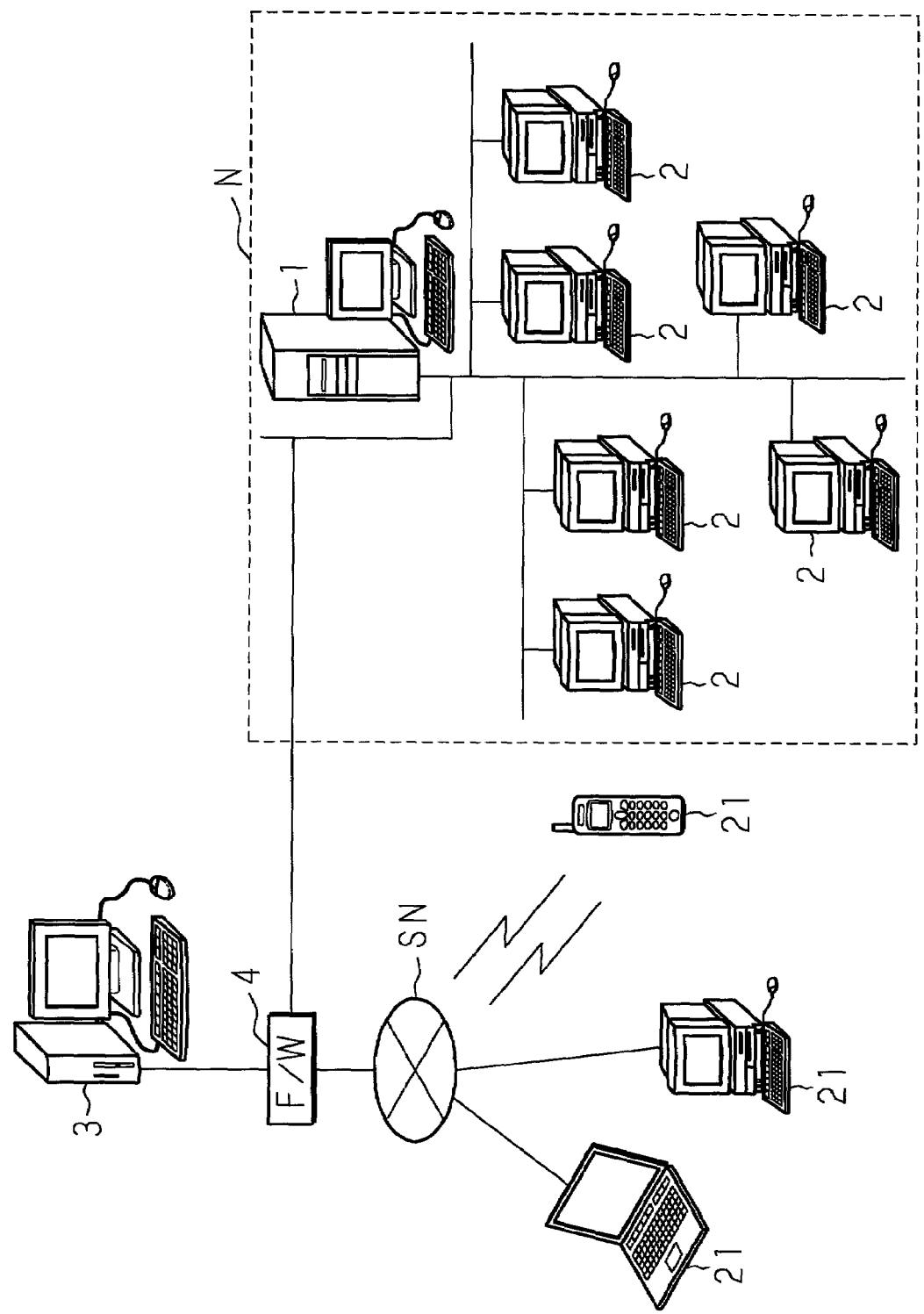
FIG. 1 is an explanatory view for showing an outline of a disclosing system.

FIG. 1 is an explanatory view for showing an outline of a disclosing system. A reference numeral 1 indicates a central apparatus in which browsable information and headline information are stored. To the central apparatus 1 are connected terminal apparatuses 2 such as personal computers, through a communication network N such as an intranet which is formed in a predetermined space. Each of the terminal apparatuses 2 can obtain necessary browsable information. Also, to the central apparatus 1 are connected terminal apparatuses 21 outside the intranet through an auxiliary communication network SN such as the internet, each of which can also obtain the browsable information.

When a terminal apparatus 21 obtains browsable information from the central apparatus 1 through the auxiliary communication network SN, direct access to the central apparatus 1 is not authorized by an F/W computer 4, which functions as a firewall, and only access to a computer 3 provided with WWW (World Wide Web) server functions is authorized. The computer 3 sends a request for necessary information to the central apparatus 1 in response to the request sent from the terminal apparatus 21, and transmits obtained browsable information to the terminal apparatus 21.

Figure 2:
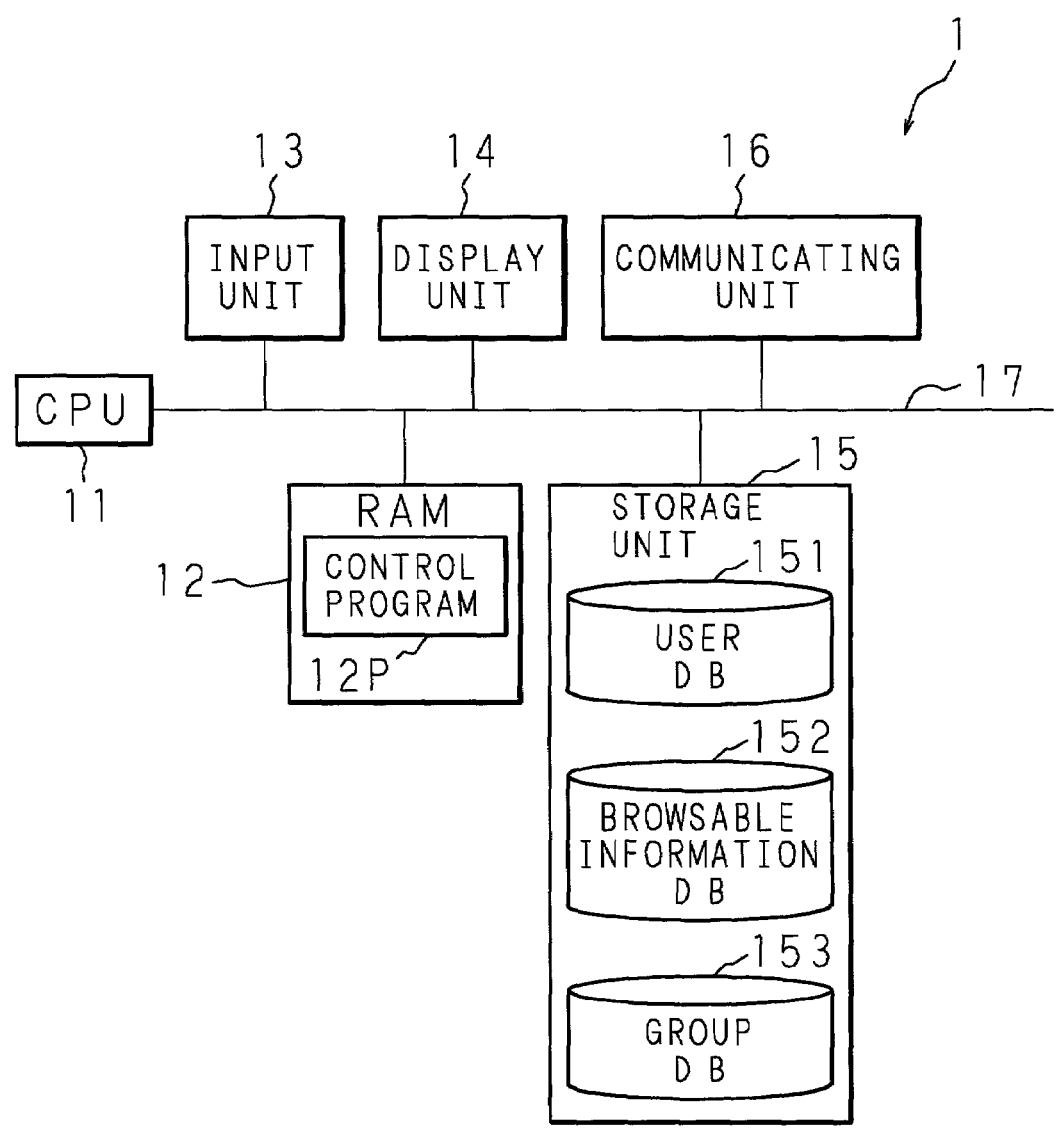
FIG. 2 is a block diagram for showing a hardware configuration of a central apparatus.

FIG. 2 is a block diagram for showing a hardware configuration of the central apparatus 1. As shown in the figure, to the CPU (Central Processing Unit) 11 are connected through a bus 17 a RAM (Random Access Memory) 12, an input unit 13 such as a keyboard and a mouse, a display unit 14 such as an LCD, a storage unit 15 such as a hard disk, and a communication unit 16 such as a LAN connection board. The RAM 12 stores a control program 12P containing an application prepared in language such as Java or C, for executing a disclosing method of the invention described later.

The storage unit 15 stores therein a user database (hereinafter abbreviated as a user DB) 151 in which user information is stored, browsable information database (hereinafter abbreviated as a browsable information DB) 152 in which browsable information, headline information thereof and the like are stored, and a group database (hereinafter abbreviated as a group DB) 153 in which information of groups to which a user belongs is stored. Contents of these DBs are described later. Although the following will describe a case where intramural browsable information of a university stored in the central apparatus 1 is browsed with the terminal apparatus 2 used by a student, a professor, a staff and the like, the invention is also applicable to a case where browsable information inside an enterprise or a hospital is browsed.

FIG. 3 is an explanatory view for showing a record layout of a user DB 151. As shown in the figure, for each student, information of his password, his student number, his name, his department, his subject, his study room and the like which is registered to be used for authentication when browsing the browsable information in association with his inherent identification information (hereinafter abbreviated as ID). These information items may be inputted by an administrator through the input unit 13 as occasion demands.

FIG. 4 is an explanatory view for showing a record layout of the group DB 153. The group DB 153 stores therein a department DB 1531 in which IDs of students belonging to each department are stored, a subject DB 1532 in which IDs of students belonging to each subject are stored, and a study room DB 1533 in which IDs of students belonging to each study room are stored. The subject DB 1531 sorts therein the user DB 151 using the information of each department as a key and, likewise, the subject DB 1532 and the study room DB 1533 also sort therein the user DB 151 for each item.

FIG. 5 is an explanatory view for showing an image displayed when registering browsable information. Browsable information presented by a professor, an office and the like is stored when the administrator uploads the information from the terminal apparatus 2 to the central apparatus 1. Although the following will describe such an aspect that the administrator uploads the browsable information from the terminal apparatus 2 to the central apparatus 1 in this embodiment, the professor etc. may upload the information from his own terminal apparatus 2 to the central apparatus 1, and furthermore, the administrator may input the browsable information through the input unit 13 of the central apparatus 1.

When the administrator has logged in using his inherent ID, a document such as an HTML shown in FIG. 5 is displayed on the browser. The entered items may include headline information of the browsable information, storage location information and the like. The headline information of the browsable information is a title of a hyperlink, while the storage location information indicates a jump destination reached when a hyperlink indicated by the headline information is clicked. For example, when a hyperlink indicated by headline information "Members List for Study Room in 2001" is clicked, an HTML is read from a saving source in which the information is inputted in a field of the storage location information and then transferred to the terminal apparatus 2.

As for the storage location information according to the invention, two URLs are registered for the same browsable information in order to limit the browsable information according to whether the request is sent through the communication network N or through the auxiliary communication network SN different from the communication network N. Specifically, intramural URL and extramural URL are inputted. As for the extramural URL, attribute information, which indicates whether browsing is limited or not, can be set according to will of the administrator or a registration requester.

For example, to authorize external browsing of information of a canceled class, "authorized" is registered as the limitation information. In this case, when a student registered to the class has accessed through the intramural terminal apparatus 2 to the central apparatus 1, the intramural URL and the headline information are extracted, so that a hyperlink made up of the extracted intramural URL and the headline information is integrated into a document such as an HTML (hereinafter described as an HTML) on the top page to thereby generate an HTML containing the hyperlink. The generated HTML is transmitted to the terminal apparatus 2. On the other hand, when access to the computer 3 is made from the terminal apparatus 21 through the auxiliary communication network SN such as the internet, a flag is set which indicates that the access is made through the auxiliary communication network SN and the information having thus set flag is transmitted to the central apparatus 1. The central apparatus 1 refers the flag to extract the extramural URL and the headline information and generates an HTML containing a hyperlink made up of the extramural URL and the headline information.

When "authorized" has been set as the limitation information in this case, the generated HTML is transmitted to the terminal apparatus 21. However, there may be such a case where information such as individual records and research data should not be made official. In such a case, "limited" is registered as the limitation information so that the registered headline information and extramural URL cannot be extracted to disable external access to the information.

Besides this information, authorized user information for authorizing to browse the browsable information is inputted. The authorized user information can be registered by inputting ID for each user, each study room or each subject as shown in the figure. To input the ID as a group, name of the subject, the study room or the like to be official is inputted as shown in the figure. Such information is inputted for each browsable information item.

Thus inputted browsable information and the accompanying information are transmitted to the central apparatus 1 and stored in the browsable information DB 152. FIG. 6 is an explanatory view for showing a record layout of a browsable information DB 152. The headline information, the intramural and extramural URLs, the authorized user information, and the limitation information are stored in association with the storage location information.

To realize the method for limiting the browsable information according to whether the request is sent through the communication network N or through the auxiliary communication network SN, the limitation information can be set as mentioned above and, besides, limitation of information also can be controlled according to set contents of the intramural and extramural URLs without providing an item of the limitation information. In this case, when neither of the intramural and extramural URLs is set, no hyperlink including the headline information is generated. In the case of the request through the communication network N, a hyperlink is generated by extracting the headline information, for which the intramural URL is set, from the browsable information authorized to the authorized user. In the case of the request through the auxiliary communication network SN, a hyperlink is generated by extracting the headline information, for which the extramural URL is set, from the browsable information authorized to the authorized user. Combinations of the set states of the intramural and extramural URLs and the limitation according to the access path is not limited to the above and can be controlled by the agreement made beforehand.

Figure 7:
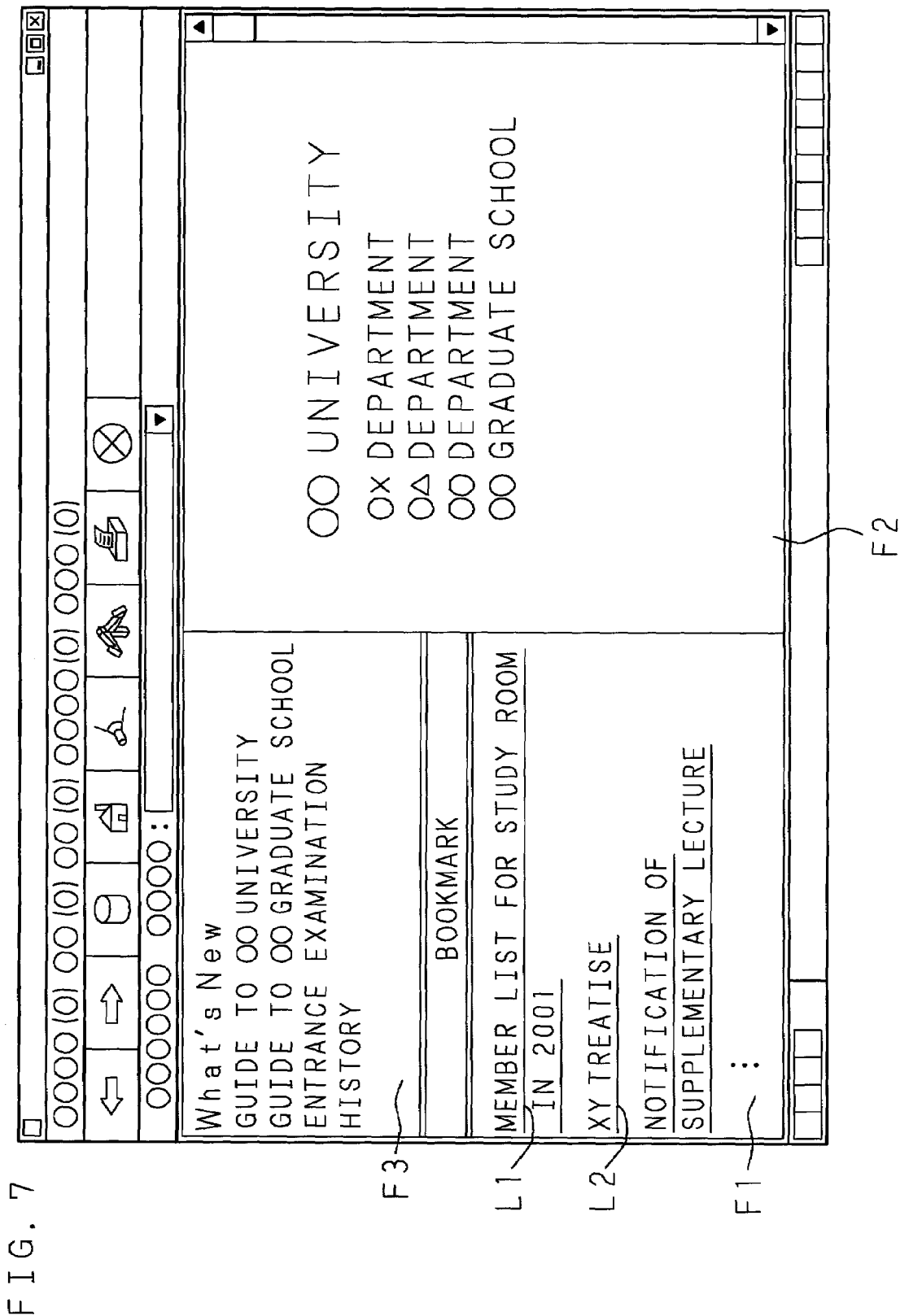
FIG. 7 is an explanatory view for showing an image displayed on the browser when access is made from a terminal apparatus through a communication network.

FIG. 7 is an explanatory view for showing an image displayed on the browser when access is made from a terminal apparatus through a communication network N. When access to the central apparatus 1 is made from the terminal apparatus 2 through the communication network N, information common to each student is displayed in regions indicated by frames F2 and F3. In frame Fl, on the other hand, such a hyperlink is displayed that enables accessing the browsable information necessary for each student. This hyperlink is clicked to browse the browsable information. The browsable information displayed at frame F1 may differ for each student.

Figure 11:
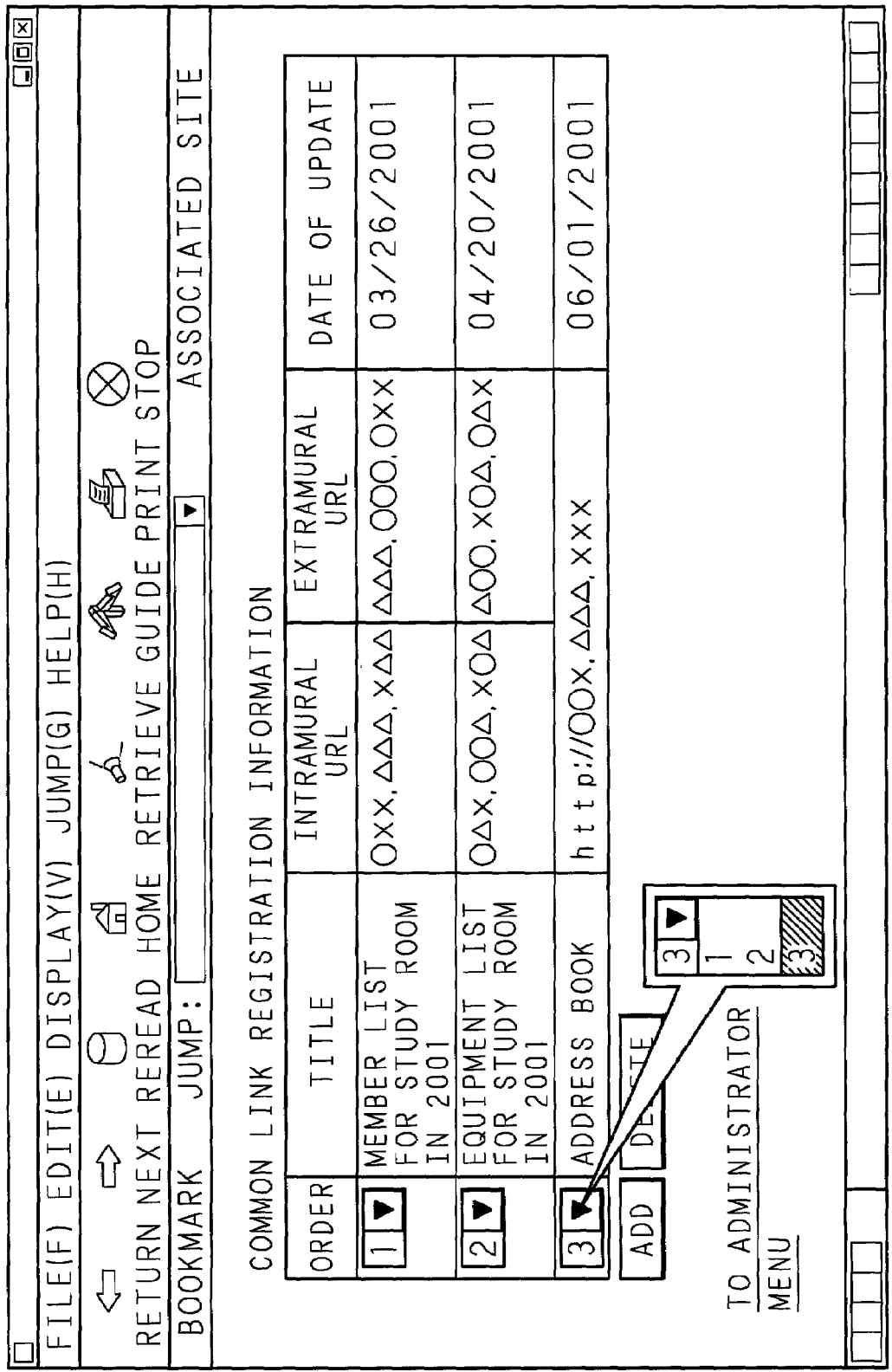
FIG. 11 is an explanatory view for showing an image according to another embodiment, displayed when registering browsable information.

When the user ID is 1001, "Members List for Study Room in 2001" and "XY Treatise" are extracted from the browsable information DB shown in FIG. 6 to display a hyperlink indicated by L1 and L2 as shown in FIG. 7. On the other hand, when access to the computer 3 is made from the terminal apparatus 2 through the auxiliary communication network SN, the flag is set to transmit the information to the central apparatus 1. The central apparatus 1 refers the limitation information and, when "limited" is registered as the limitation information, extracts nothing. As a result, the headline information and the storage location information are extracted as for "Members List for Study Room in 2001", but, as for "XY Treatise", none of them is extracted, so that the hyperlink L2 shown in FIG. 7 is not displayed. When the hyperlink is clicked in this state, the system links to a URL stored in the storage location information. This permits the students etc. to easily obtain information necessary for him. FIG. 11 is an explanatory view for showing an image according to another embodiment, displayed when registering browsable information. As shown in the figure, display order of the browsable information items may be registered plainly by assigning numbers for items of the registered headline information.

Figure 8:
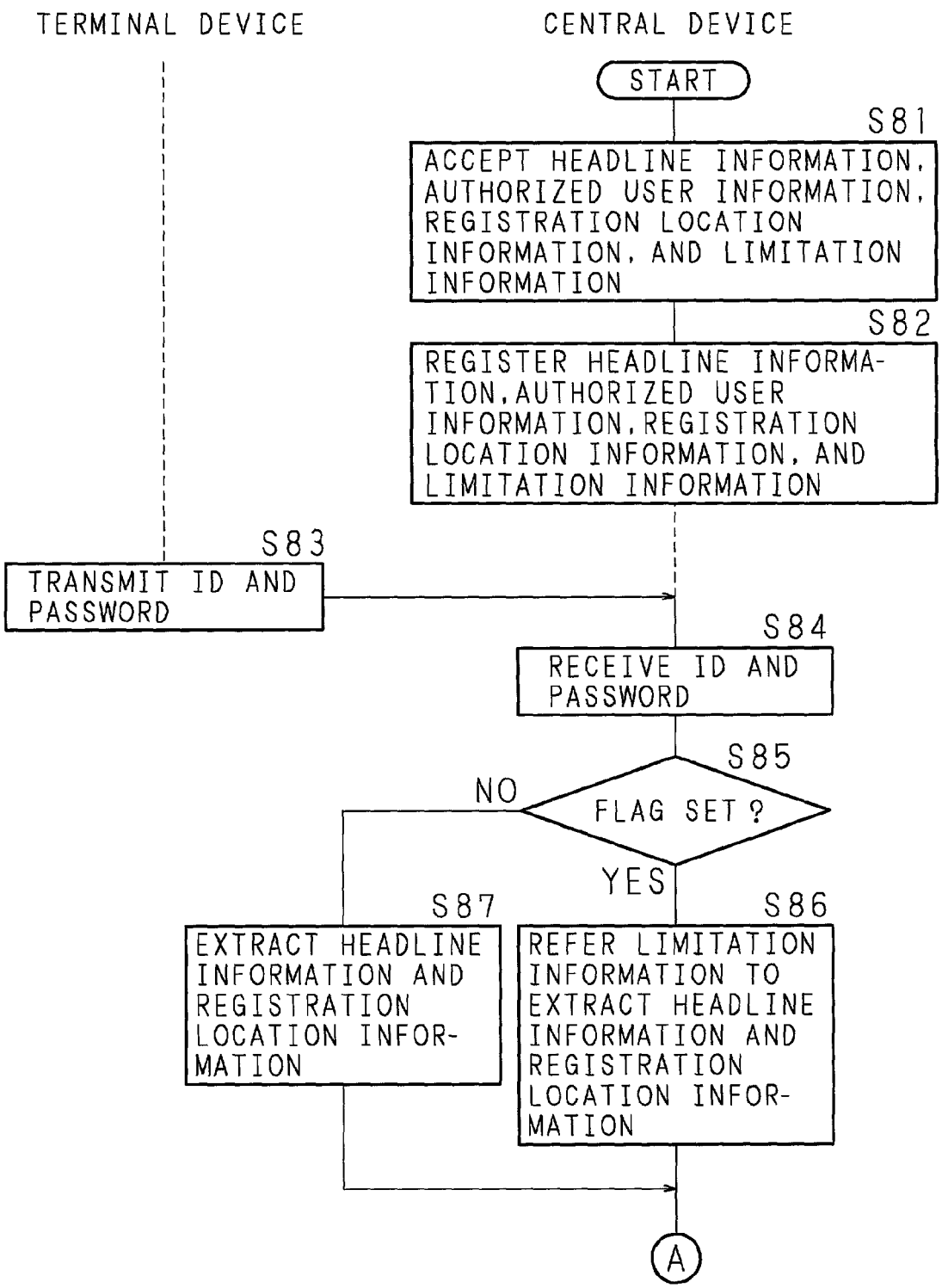
FIG. 8 is a flowchart for showing a processing procedure made when a request is sent from a terminal apparatus.
Figure 9:
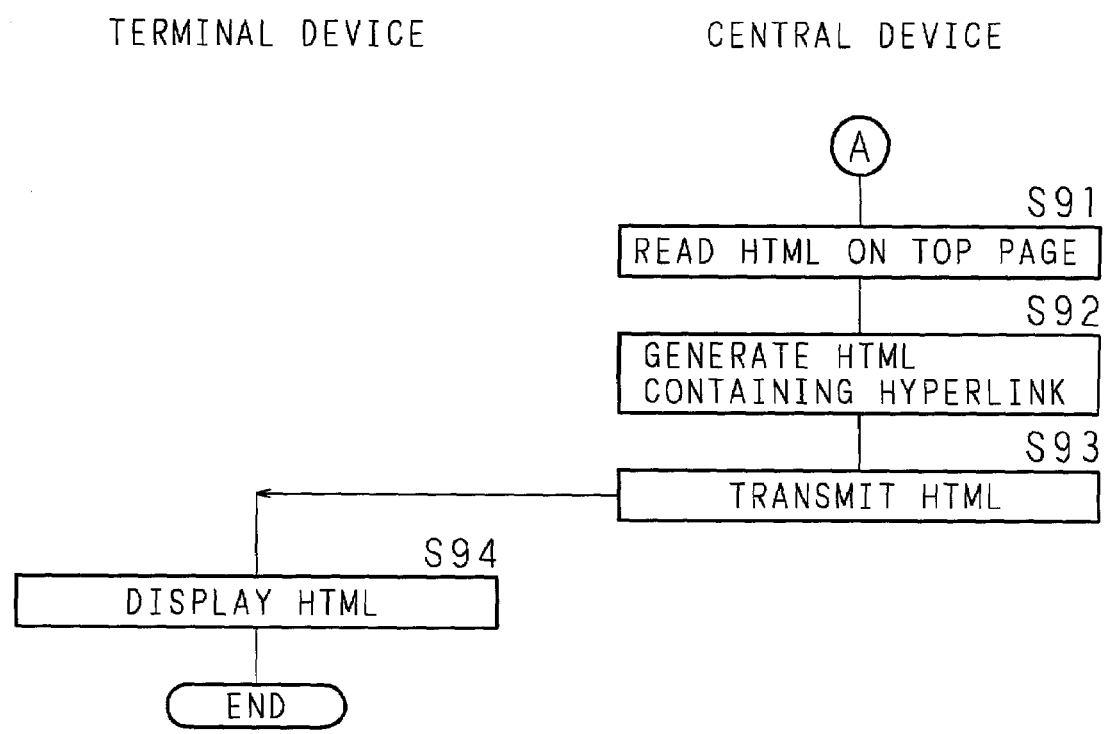
FIG. 9 is a flowchart for showing a processing procedure made when a request is sent from a terminal apparatus.

The following will describe the contents of processing in the above-mentioned configuration according to the invention, with reference to flowcharts. FIGS. 8 and 9 are flowcharts for showing a procedure for processing executed when the request is sent from the terminal apparatus 2. First, the process accepts the headline information, authorized user information, storage location information, and limitation information uploaded by the administrator (step S81) and stores these accepted information items in the browsable information DB 152 beforehand (step S82). Necessary information is already stored in the user information DB 151 and the group DB 153.

To make access from the terminal apparatus 2 through the communication network N, an ID and a password are transmitted to the central apparatus 1 (step S83). On the other hand, to make access from the terminal apparatus 2 through the auxiliary communication network SN, the ID and the password are first transmitted to the computer 3, which in turn sets a flag to transmit the flag setting information as well as the ID and password to the central apparatus 1 (step S83).

The central apparatus 1 receives the ID and the password (step S84) and refers the user DB 151 to authenticate the access, and then the central apparatus 1 judges whether the flag is set or not (step S85). When the flag is set (YES at step S85), i.e., it is judged that the request is sent from the terminal apparatus 21 through the extramural auxiliary communication network, the process refers the limitation information to extract an extramural URL, which is the headline information and storage location information, from the browsable information DB 152 using the ID as a key (step S86) and then stores thus extracted headline information and the storage location information in the RAM 12.

On the other hand, when the flag is not set (NO at step S85), i.e., it is judged that the request is sent from the terminal apparatus 2 through the intramural communication network N, the process extracts an intramural URL, which is the headline information and storage location information, from the browsable information DB 152 using the ID as a key without referring the limitation information (step S87) and then stores thus extracted headline information and the storage location information in the RAM 12. The central apparatus 1 reads an HTML on the top page stored in the storage unit 15 beforehand (step S91), reads the headline information and storage location information stored in the RAM 12, and then generates an HTML for each user, the HTML including a hyperlink made up of thus read headline information and storage location information (step S92). Specifically, the process writes the extracted storage location information and the headline information into tags indicated by <A HREF> through </A> respectively and then inserts these tags at appropriate portions in the read HTML, thereby generating an HTML for each user.

The generated HTML is transmitted to the terminal apparatus 2, or to the terminal apparatus 21 through the computer 3 (step S93). With this step, at the terminal apparatus 2 or 21, an HTML shown in FIG. 7 is displayed on the browser (step S94). At the terminal apparatus 2, the hyperlink is displayed without taking the limitation information into account since access is made from inside the university, while at the terminal apparatus 21, no predetermined hyperlink is displayed taking the limitation information into account since access is made from outside the university. Although the above embodiment has been described using an HTML for an example of a language in which home page contents are prepared, the invention is not limited thereto; for example, any other structured language or markup language may be used.

Embodiment 2.

Figure 10:
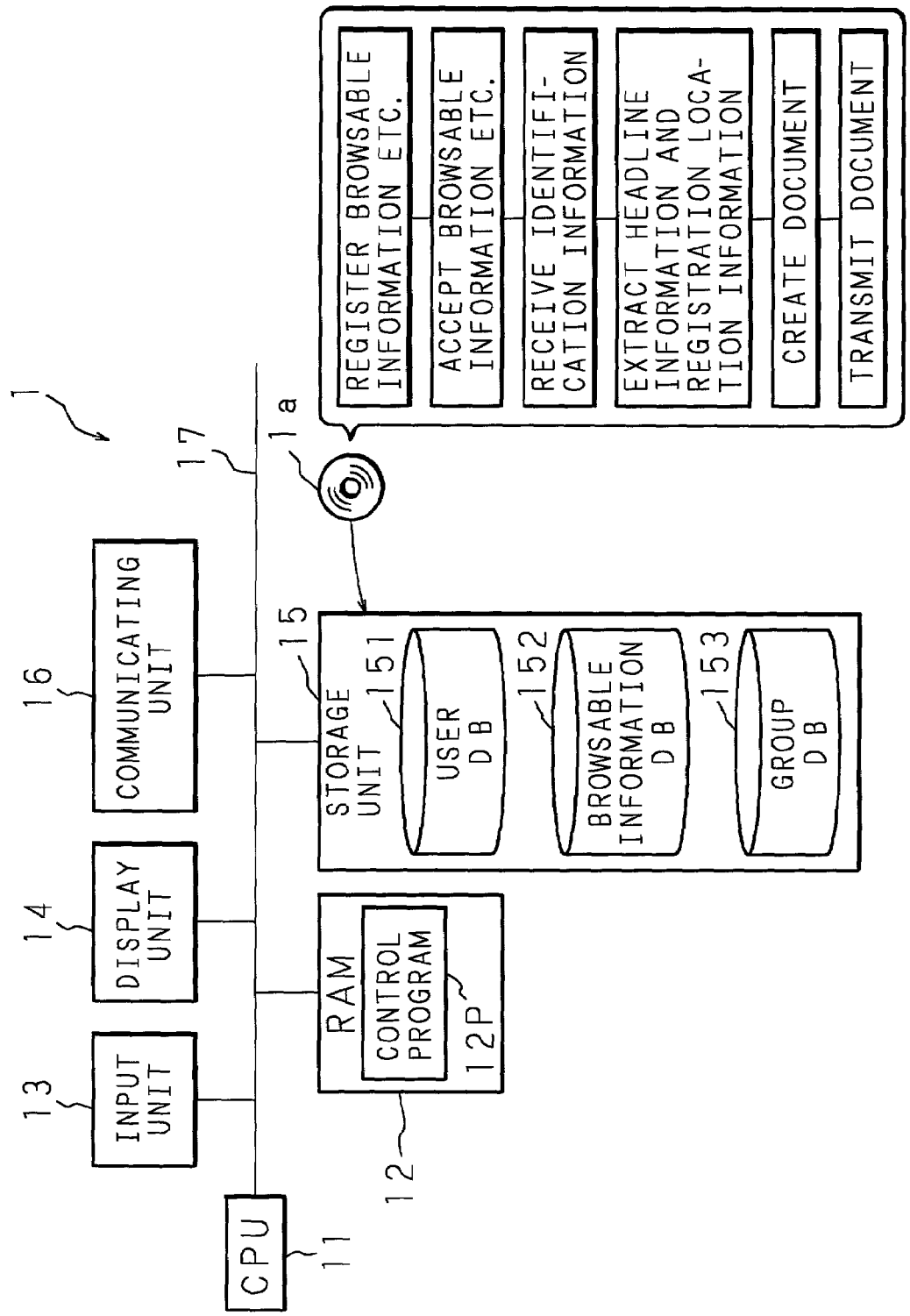
FIG. 10 is a block diagram for showing a configuration of the central apparatus according to Embodiment 2.

FIG. 10 is a block diagram for showing a configuration of the central apparatus according to Embodiment 2. The computer program for executing the central apparatus 1 according to Embodiment 1 may be provided as pre-installed in the central apparatus 1 as described in Embodiment 2 or provided in a portable computer memory product such as a CD-ROM or MO. Furthermore, the computer program may be provided as propagated in a carrier wave through the line. The following will describe the contents specifically.

In the storage unit 15 of the central apparatus 1 shown in FIG. 1 is installed a computer memory product 1a (CD-ROM, MO, DVD-ROM or the like) which records programs for accepting the browsable information etc., registering the information, receiving the identification information, extracting the headline information and the storage location information, generating documents, and transmitting the documents. Those programs are loaded in the RAM 12 of the central apparatus 1 and executed. This permits the system to function as the above-mentioned central apparatus 1 of the invention.

Since Embodiment 2 of the invention has such a configuration and has almost the same components and actions as those of Embodiment 1, the same or similar elements are indicated by the same reference numbers and their detailed explanation is omitted.

As this invention may be embodied in several forms without departing from the spirit of essential characteristics thereof, present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A disclosing method for disclosing browsable information stored in a central apparatus in response to a request sent from a terminal apparatus connected to the central apparatus through a communication network, comprising:

accepting headline information of the browsable information, allowable user information of a user who is allowed to browse the browsable information, and storage location information of the browsable information;

registering the accepted headline information and the allowable user information in association with the storage location information;

receiving identification information identifying a user, which identification information is sent from the terminal apparatus to the central apparatus;

extracting a hyperlink title and a URL of a storage location, which are associated with the received identification information as allowable user information, based on the received identification information;

generating a document containing a hyperlink including the extracted hyperlink title wherein hyperlink to the extracted URL of the storage location is defined; and transmitting the generated document to the terminal apparatus;

wherein the accepting further accepts limitation information limiting browsing of the browsable information according to whether the request is sent through the communication network or through an auxiliary communication network different from said communication network;

the registering registers the accepted headline information, limitation information, and authorized user information in association with the storage location information; and the extracting extracts the hyperlink title and the URL of the individual storage location based on the received identification information, the registered authorized user information, and the limitation information if the request was sent through the auxiliary communication network.

2. The disclosing method according to claim 1, wherein the accepting accepts first storage location information corresponding to a case where the request is accepted through the communication network and second storage location information corresponding to a case where the request is accepted through an auxiliary communication network different from said communication network;

the registering registers the accepted headline information and the authorized user information items in association with the first and the second storage location information; and the extracting extracts the hyperlink title and a first URL of the individual storage location, for which said first URL of the individual storage location is set, based on the received identification information and the registered authorized user information if the request was sent through the communication network, and, extracts the hyperlink title and a second URL of the individual storage location, for which said second URL of the individual storage location is set, based on the received identification information and the registered authorized user information if the request was sent through the auxiliary communication network.

3. A disclosing system for disclosing browsable information, comprising:

a central apparatus in which the browsable information is stored; and a terminal apparatus, which is connected to the central apparatus through a communication network, sending a request to said central apparatus, wherein the central apparatus includes a processor capable of performing operations of accepting headline information of the browsable information, authorized user information of a user authorized to browse the browsable information, and storage location information of the browsable information;

registering the accepted headline information and authorized user information in association with the storage location information;

receiving identification information identifying a user, which identification information is sent from the terminal apparatus to the central apparatus;

extracting a hyperlink title and a URL of the individual storage location based on the received identification information and the registered authorized user information;

generating a document containing a hyperlink including the extracted hyperlink title, wherein the hyperlink to the extracted URL of an individual storage location is defined; and transmitting the generated document to the terminal apparatus;

wherein the accepting operation accepts limitation information limiting browsing of the browsable information according to whether the request is sent through the communication network or through an auxiliary communication network different from said communication network, the registering operation registers the accepted headline information, limitation information, and authorized user information in association with the storage location information, and the extracting operation extracts the hyperlink title and the URL of the individual storage location based on the received identification information and the registered authorized user information and limitation information if the request was sent through the auxiliary communication network.

4. A central apparatus, in which browsable information is stored, for disclosing said browsable information in response to a request sent from outside, comprising;

a processor, the processor capable of performing operations of:

accepting headline information of the browsable information, authorized user information of a user authorized to browse the browsable information, and storage location information of the browsable information, registering the accepted headline information and the authorized user information in association with the storage location information, receiving identification information identifying a user, which identification information is sent from the terminal apparatus to the central apparatus, extracting a hyperlink title and a URL of the individual storage location based on the received identification information and the registered authorized user information, generating a document containing a hyperlink including the extracted hyperlink title, wherein the hyperlink to the extracted URL of the individual storage location is defined, and transmitting the generated document to the terminal apparatus;

wherein:

the accepting accepts limitation information limiting browsing of the browsable information according to whether the request from the outside is sent through the communication network or through an auxiliary communication network different from said communication network, the registering registers the accepted headline information, limitation information, and authorized user information in association with the storage location information, and the extracting extracts a hyperlink title and the URL of the individual storage location based on the received identification information, the registered authorized user information, and the limitation information if the request was sent through the auxiliary communication network.

5. A computer memory product, in which browsable information is stored and a computer program for disclosing said browsable information is recorded in response to a request sent from outside, the computer memory product causing a computer to accept headline information of the browsable information, authorized user information of a user authorized to browse the browsable information, and storage location information of the browsable information;

causing the computer to register the accepted headline information and authorized user information in association with the storage location information;

causing the computer to receive identification information identifying a user, the identification information is transmitted from outside;

causing the computer to extract a hyperlink title and a URL of the individual storage location based on the received identification information and the registered authorized user information;

causing the computer to generate a document containing a hyperlink including the extracted hyperlink title, wherein the hyperlink to the extracted URL of an individual storage location is defined; and causing the computer to transmit the generated document outside of the computer;

wherein:

the accepting causes the computer to further accept limitation information limiting browsing of the browsable information according to whether the request from the outside is sent through the communication network or through an auxiliary communication network different from said communication network;

the registering causes the computer to register the accepted headline information, limitation information, and authorized user information in association with the storage location information; and the extracting causes the computer to extract the hyperlink title and the URL of the individual storage location based on the received identification information, the registered authorized user information, and the limitation information if the request was sent through the auxiliary communication network.

6. A disclosing system for disclosing browsable information comprising:

a central apparatus in which the browsable information is stored; and a terminal apparatus, which is connected to the central apparatus through a communication network, sending a request to said central apparatus, wherein the central apparatus includes:

acceptance means for accepting headline information of the browsable information, authorized user information of a user authorized to browse the browsable information, and storage location information of the browsable information, registration means for registering the accepted headline information and authorized user information in association with the storage location information means for receiving identification information for identifying a user, which identification information is sent from the terminal apparatus to the central apparatus, extraction means for extracting a hyperlink title and a URL of the individual storage location based on the received identification information and the registered authorized user information, generation means for generating a document containing a hyperlink including the extracted hyperlink title, wherein the hyperlink to the extracted URL of an individual storage location is defined, and transmission means for transmitting the generated document to the terminal apparatus;

wherein:

the acceptance means accepts limitation information for limiting browsing of the browsable information according to whether the request is sent through the communication network or through an auxiliary communication network different from said communication network;

the registration means registers the accepted headline information, limitation information, and authorized user information in association with the storage location information; and the extraction means extracts the hyperlink title and the URL of the individual storage location based on the received identification information and the registered authorized user information and limitation information if the request was sent through the auxiliary communication network.

7. A central apparatus, in which browsable information is stored, for disclosing said browsable information in response to a request sent from outside, comprising:

a processor, the central apparatus capable of performing operations of acceptance means for accepting headline information of the browsable information, authorized user information of a user authorized to browse the browsable information, and storage location information of the browsable information;

registration means for registering the accepted headline information and authorized user information in association with the storage location information;

means for receiving identification information for identifying a user, which identification information is sent from outside;

extraction means for extracting a hyperlink title and the a URL of the individual storage location based on the received identification information and the registered authorized user information;

generation means for generating a document containing a hyperlink including the extracted hyperlink title, wherein the hyperlink to the extracted URL of an individual storage location is defined; and transmission means for transmitting the generated document outside of the central apparatus;

wherein:

the acceptance means accepts limitation information for limiting browsing of the browsable information according to whether the request from the outside is sent through the communication network or through an auxiliary communication network different from said communication network;

the registration means registers the accepted headline information, limitation information, and authorized user information in association with the storage location information; and the extraction means extracts the hyperlink title and the URL of the individual storage location based on the received identification information, the registered authorized user information, and the limitation information if the request was sent through the auxiliary communication network.

8. A disclosing method for disclosing browsable information stored in a central apparatus in response to a request sent from a terminal apparatus connected to the central apparatus through a communication network, comprising:

accepting headline information of the browsable information, authorized user information for authorizing a user to browse the browsable information, limitation information, and storage location information of the browsable information;

registering the accepted headline information and the authorized user information in association with the storage location information;

receiving identification information identifying a user, which identification information is sent from the terminal apparatus to the central apparatus;

authenticating access by comparing the received identification information with the registered authorized user information;

judging whether a flag indicating the request was sent through an extramural communication network is set;

extracting a hyperlink title and a URL of an individual storage location;

generating a document containing a hyperlink including the extracted hyperlink title wherein the hyperlink to the extracted URL of the individual storage location is defined without referring to the limitation information if the flag is not set generating the document containing the hyperlink including the extracted hyperlink title wherein the hyperlink to the extracted URL of the individual storage location is defined by referring to the limitation information if the flag is set; and transmitting the generated document to the terminal apparatus.

9. A disclosing method for disclosing browsable information stored in a central apparatus in response to a request sent from a terminal apparatus connected to the central apparatus through a communication network, comprising:

accepting headline information of the browsable information, authorized user information for authorizing a user to browse the browsable information, limitation information, and storage location information of the browsable information;

registering the accepted headline information and the authorized user information in association with the storage location information;

receiving identification information identifying a user, which identification information is sent from the terminal apparatus to the central apparatus;

authenticating access by comparing the received identification information with the registered authorized user information;

extracting a hyperlink title and a URL of an individual storage location;

generating a document containing a hyperlink including the extracted hyperlink title wherein the hyperlink to the extracted URL of the individual storage location is defined without referring to the limitation information if the request was sent through an intramural communication network;

generating the document containing the hyperlink including the extracted hyperlink title wherein the hyperlink to the extracted URL of the individual storage location is defined by referring to the limitation information if the request was sent through an extramural communication network; and transmitting the generated document to the terminal apparatus.

* * * * *

UNITED STATES PATENT AND TRADEMARK OFFICE
CERTIFICATE OF CORRECTION

| | | |
|---|---|---|
| PATENT NO. | : 7,313,558 B2 | Page 1 of 1 |
| APPLICATION NO. | : 10/026458 | |
| DATED | : December 25, 2007 | |
| INVENTOR(S) | : Yoshiko Akazawa et al. | |

It is certified that error appears in the above-identified patent and that said Letters Patent is hereby corrected as shown below:

Column 10, Line 46, in Claim 4, change "comprising;" to --comprising:--.

Column 12, Line 12, in Claim 6, after "information" insert --,--.

Column 14, Line 1, in Claim 8, after "set" insert --;-- and a paragraph break.

Signed and Sealed this

Thirteenth Day of May, 2008

JON W. DUDAS
*Director of the United States Patent and Trademark Office*